United States Patent
Sundar et al.

(10) Patent No.: US 9,730,068 B2
(45) Date of Patent: Aug. 8, 2017

(54) SYSTEM AND METHOD FOR VISITOR GUIDANCE AND REGISTRATION USING DIGITAL LOCATIONS

(71) Applicant: Honeywell International Inc., Morristown, NJ (US)

(72) Inventors: K. Nagu Sundar, Tamil Nadu (IN); N. Ganesh Kumar, Tamil Nadu (IN); B. S. Balaji, Tamil Nadu (IN); Vinoth Dharmalingam, Tamil Nadu (IN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 356 days.

(21) Appl. No.: 14/060,469

(22) Filed: Oct. 22, 2013

(65) Prior Publication Data

US 2015/0111536 A1    Apr. 23, 2015

(51) Int. Cl.

| | | |
|---|---|---|
| *H04W 12/08* | (2009.01) |
| *H04W 4/02* | (2009.01) |
| *G01C 21/20* | (2006.01) |
| *H04L 29/06* | (2006.01) |
| *H04W 12/04* | (2009.01) |

(Continued)

(52) U.S. Cl.
CPC .......... *H04W 12/08* (2013.01); *G01C 21/206* (2013.01); *H04W 4/02* (2013.01); *H04W 4/021* (2013.01);
(Continued)

(58) Field of Classification Search
CPC ....... H04W 12/08; H04W 4/02; H04W 4/021; H04W 12/04; G01C 21/206; H04L 67/02;
(Continued)

(56) References Cited

U.S. PATENT DOCUMENTS

| | | | |
|---|---|---|---|
| 6,473,030 B1* | 10/2002 | McBurney | G01C 21/206 342/357.43 |
| 2002/0067261 A1* | 6/2002 | Kucharczyk | A47G 29/141 340/568.1 |

(Continued)

FOREIGN PATENT DOCUMENTS

KR    10-2012-0047071 A    5/2012

OTHER PUBLICATIONS

Extended European search report from corresponding EP application 14186058.5, dated Mar. 5, 2015.

*Primary Examiner* — Mehmood B Khan
(74) *Attorney, Agent, or Firm* — Husch Blackwell LLP

(57) ABSTRACT

A system including a smartphone or tablet of a visiting user accessing a web site and security system of a visited person, the security system having a secured area with the visited person located at a predetermined location within the secured area, the web site downloading an initial geographical location of the visiting user from the smartphone or tablet of the visiting user, a processor of the web site generating and sending a map to the smartphone or tablet based upon the downloaded initial geographic location of the visiting user and the predetermined location of the visited person, the smartphone or table displaying the generated map on a display of the smartphone or tablet guiding the visiting user from the initial location of the visiting user to the predetermined location of the visited person and the processor of the website dynamically updating the map displayed on the smartphone or tablet.

18 Claims, 3 Drawing Sheets

(51) Int. Cl.
  *G07C 9/00* (2006.01)
  *G07C 11/00* (2006.01)
(52) U.S. Cl.
  CPC ...... *G07C 9/00174* (2013.01); *G07C 2011/04* (2013.01); *H04L 63/107* (2013.01); *H04W 12/04* (2013.01)
(58) Field of Classification Search
  CPC .............. H04L 63/107; G07C 9/00174; G07C 2011/04
  See application file for complete search history.

(56) References Cited

U.S. PATENT DOCUMENTS

| | | | | |
|---|---|---|---|---|
| 2005/0159863 | A1* | 7/2005 | Howard | G08G 1/20 701/37 |
| 2006/0092016 | A1* | 5/2006 | Modes | G01C 21/206 340/539.13 |
| 2006/0111125 | A1* | 5/2006 | Karaoguz | H04L 63/083 455/456.2 |
| 2007/0094511 | A1* | 4/2007 | Wilson | G06F 12/1408 713/181 |
| 2007/0096871 | A1* | 5/2007 | Mason | G06F 21/34 340/5.61 |
| 2009/0070273 | A1* | 3/2009 | Moryto | G06Q 10/087 705/80 |
| 2011/0105092 | A1 | 5/2011 | Felt et al. | |
| 2011/0145053 | A1* | 6/2011 | Hashim-Waris | G06Q 30/0235 705/14.35 |
| 2012/0310852 | A1 | 12/2012 | Ramalingamoorthy et al. | |
| 2013/0183924 | A1* | 7/2013 | Saigh | H04W 4/025 455/404.2 |
| 2014/0266699 | A1* | 9/2014 | Poder | G08B 25/001 340/539.13 |

* cited by examiner

SYSTEM AND METHOD FOR VISITOR GUIDANCE AND REGISTRATION USING DIGITAL LOCATIONS

FIELD

The field of the invention relates to security systems and more particularly to providing access to visitors.

BACKGROUND

Security systems are generally known. Such systems are typically used in homes and businesses for the protection of assets and people.

In most cases, a security system typically involves a secured area surrounded by physical barrier (e.g., a fence, walls, etc.) and with a number of sensors around a periphery that detect the entry of intruders into the secured area. The sensors, in turn, are connected to a central monitoring station that monitors a state of the sensors.

Entry into secured areas by authorized persons may be provided through one or more access points. In the case of a business, access may be controlled by a receptionist in a lobby. In other cases, entry may be automatically provided through a locked door by presentation of an access card to a card reader or through entry of an appropriate personal identification number (PIN) into a keypad adjacent the locked door.

While security systems work well, they are not particularly well adapted to accommodate visitors. In most cases, a receptionist is necessary in order to inquire about a purpose of the visit and who the visitor would like to see. The receptionist must then call the visited person for entry authorization. Accordingly, a need exists for better methods of accommodating visitors while preserving the security of such areas.

DETAILED DESCRIPTION OF AN ILLUSTRATED EMBODIMENT

Figure 1:
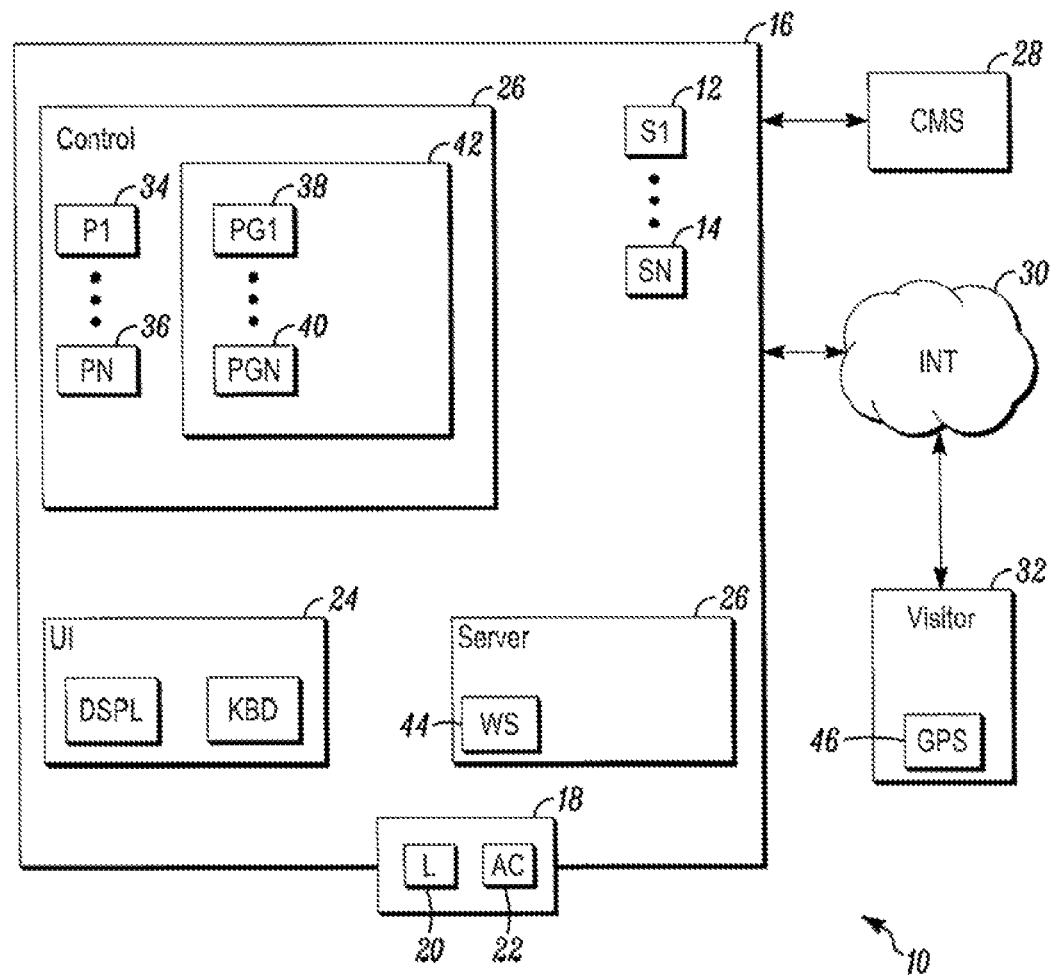
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the security system may be a number of sensors 12, 14 used to for protection of a secured area 16. The sensors may be limit switches placed on doors or windows around a periphery of secured area and where the sensors are intended to detect intruders.

Also included within the security system may be one or more access control devices (e.g., doors, turnstiles, etc.) 18 that control access by authorized persons into and out of the secured area. Each access control device may include an electrically operated lock 20 and an access request device 22. The access request device may be a card reader that reads identity cards or keyboard used by an authorized party to enter a personal identification number (PIN).

The sensors and access control devices may be monitored by a security controller 26 located within the secured area or within a central monitoring station 28. Upon activation of one of the sensors, the controller may alert security personnel within the central monitoring station. The security personnel may dispatch the police in response to an intruder detected by one of the sensors.

The security controller may also monitor the access request devices for input from authorized users. Upon detecting an authorized user, the security controller may activate the lock to allow access into the secured area by authorized persons.

Also located within the secured area may be one or more user interface devices (e.g., desktop computers, laptop devices, etc.) 24. The user interface devices may be coupled to a server 26. While the server 26 and security controller are shown as separate devices, it should be understood that in some embodiments they may be integrated into the same processing apparatus.

The server may provide communication access between an authorized user and outside parties through the Internet 30. For example, an outside party may use a portable wireless device (e.g., smartphone, tablet, etc.) 32 to send an e-mail to the user device 24 of an authorized person within the secured area via the Internet and server.

Included within the security controller, the user device, the server and the portable wireless devices is one or more processor apparatus (processors) 34, 34 each operating under control of one or more computer programs 38, 40 loaded from a non-transient computer readable medium (memory) 42. As used herein, reference to a step performed by a computer program is also reference to the processor that executed that step of the program.

Included within the server may be a visitor access program of a visitor management system that allows an authorized user to automatically provide guidance to a location of the authorized user and also access into the secured area. In this regard the visitor access program relies upon location information automatically obtained from the visitor to plot a map from an initial location of the visitor to a location of the authorized user, to estimate an arrival time and to ensure entrance into the secured area without the involvement of a receptionist or any other party.

In general, the visitor access program is a tool embodied as a single program or as a suite of programs within the server and/or security controller that achieve the described results via an interaction among the members of the suite. In this regard, a first program (or part of the program) is an invite program that sends an invitation to a potential visitor. Because of the automatic nature of entry into the secured area, access, the invitation program may be strictly limited to a predetermined number of persons within the secured area and be controlled via individual passwords.

Figure 2:
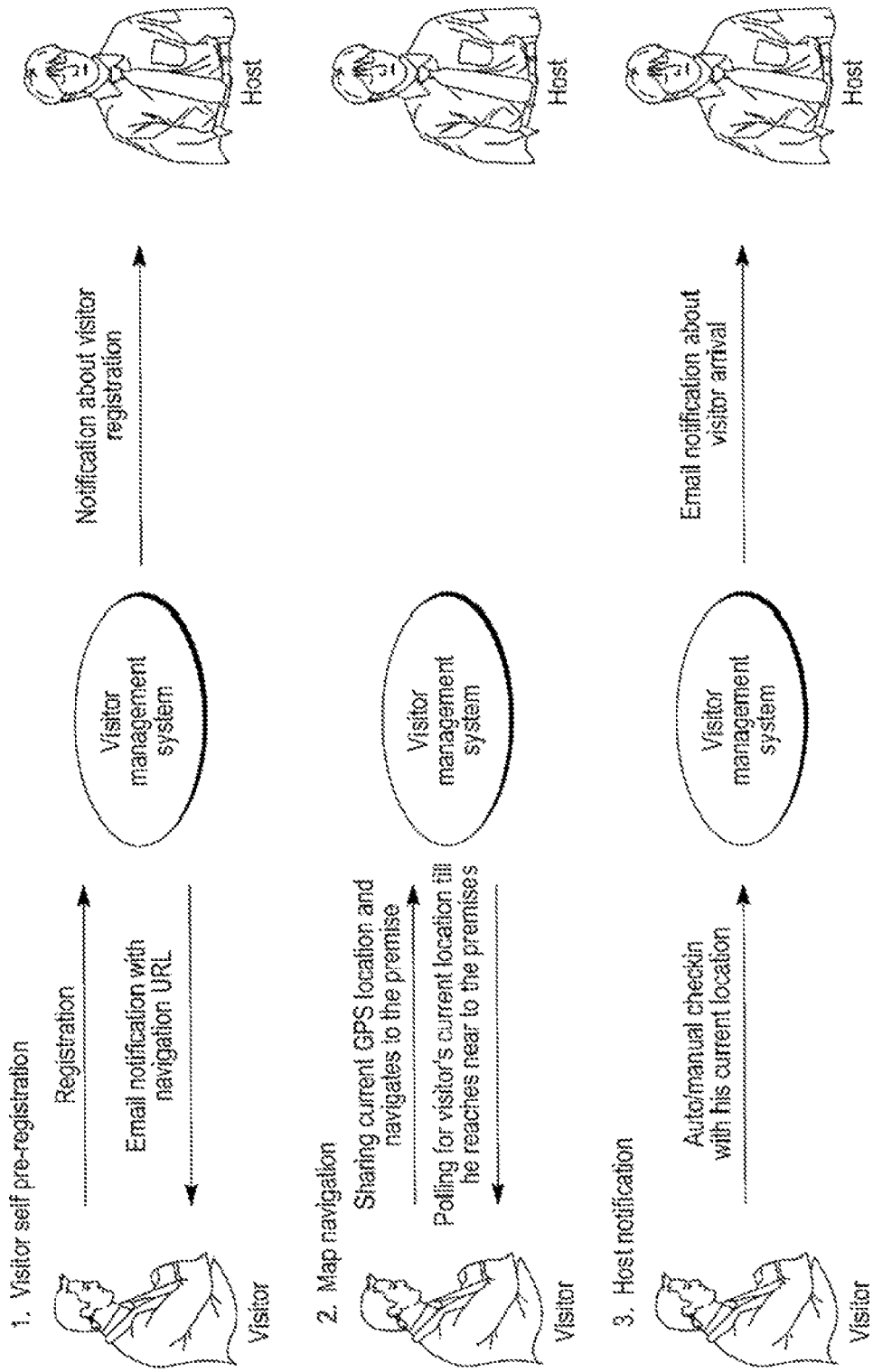
FIG. 2 is a message flow diagram of the system of FIG. 1.
Figure 3:
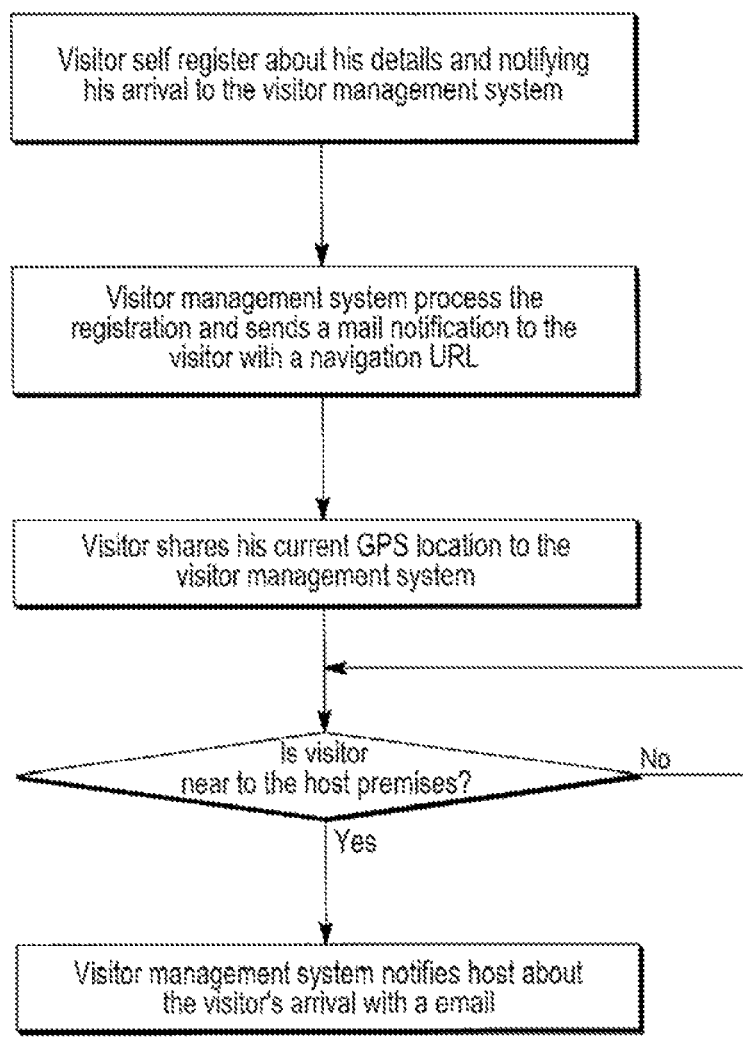
FIG. 3 is a flow chart of steps used by the system of FIG. 1.

The invitation program may operate to transfer a navigation universal resource locator (URL) to the visitor and generate an identification token for use by the visitor upon arrival that is used to allow the visitor access into the secured area (see FIGS. 2 and 3). Information about the visitor may be provided by the authorized person through the invitation program and may include an e-mail address or instant message address of the visitor.

Once the person finishes entering visitor information, the server sends the e-mail or instant message to the portable device 32 of the potential visitor. If the invitation in in the form of an e-mail, the e-mail may contain the navigation URL, the access token and text announcing that it is an invitation and that the potential visitor should activate an accept key within the message.

Activation of the acceptance key causes, a web browser of the portable device to send the accept message to a navigation program identified by the navigation URL within a web server 44. The navigation program, in turn, returns a request to the portable device for an initial geographic location of the portable device. The portable device retrieves geographical coordinates of the current location from a global positioning system (GPS) 46 operating from within the portable device and returns the location to the navigation program within the server.

The navigation program may use the location of the portable device along with knowledge of its own geographic location or predetermined location of the visited person within the secured area to generate a map including a recommended route from the initial location of the visitor to the location of the authorized person that sent the invitation. Once generated, the navigation program sends the generated map to the portable device along with embedded instructions that, inter alia, cause the generated map to be shown on a display of the portable device.

The navigation program may also dynamically update the map as it is displayed on the portable device. This may be accomplished via a routing program of the server that accesses local traffic reports along the recommended route and updates the map and recommended route accordingly.

Once downloaded, and displayed on the portable device, the GPS 46 may provide local updates that cause a relative location of the portable device to be displayed on the map of the portable device that reflects a then-current location of the portable device along the route to the visited location. The portable device may also send updates of the then current location to the navigation program within the server.

Based upon the initial location of the portable device and traffic updates, the navigation server calculates an estimated time of arrival of the visitor based upon the distance and traffic reports. This estimated travel time is updated dynamically based upon traffic reports and routing changes. This estimated travel time may be displayed on the portable device along with step-by-step travel instructions detailing each step along the route. For example, if the visitor is traveling along a highway, the step-by-step instructions may include a verbal notification issued through the portable device warning the driver of the next turn, the name of the street of the next turn and the distance to the next turn.

The map displayed on the portable device may include also one or more softkeys that allow the visitor to interact with the navigation program. One softkey may be a "will be delayed" softkey. This softkey may be used by the visitor if the visitor wishes to stop along the route for a rest break or for some other reason. Activation of the softkey may cause the display of a time window on the portable device where the delay estimated by the visitor can be entered and sent to the navigation program for incorporation into the estimated arrival time.

Another softkey (a check-in softkey) may be provided on the map for check-in by the visitor as the visitor arrives at the location of the visited person. The check-in softkey may be important in metropolitan environments where tall buildings interfere with the signal reception by the GPS and were the estimated time of arrival may not be accurate. In this regard, activation of the check-in softkey on the portable device causes the portable device to send a check-in message to the server.

The check-in message may be sent to a check-in program of the visitor access programs. The check-in message may include at least the identification token generated by the invitation program. The identification token may be used to identify the visited person within the secured area and to automatically send a notification message to the visited person notifying the visited person of the arrival of the visitor.

In general, the identification token may be embodied as, or include, a unique web link through which the server can identify the visitor and person visited. This allows the navigation program to uniquely track each visitor independent of any other visitor.

The identification token may also be used by the visited person to determine the location of any expected visitor by opening the associated web link. In this way, the host (visited person) can determine the current location of the expected visitor so that he/she can be prepared for the visit once the visitor is close to the visit location.

An access program of the visitor access suite of programs may also use the check in message to generate an access token (e.g., bar code, NFC keys, etc.) in response to a visitor check in message and to send this access token to the security panel. This can be used to eliminate any need for a front office receptionist at the time of the visit because the user can use this token to gain access to the secured area. In this case, the visitor may simply present the access token to be read by the access request device 22. Since the access token was previously provided to the security panel, the security panel activates the lock allowing access to the secured area in a manner similar to any other authorized user.

Additional authentication can be required from a visitor at the time of entry into the secured area by first providing the visitor with a password, PIN or an ID service number before issuing the access token. Once the visitor arrives at the secured area, the visitor presents the access token to be read by the access request device. The access request device then requests additional confirmation by requiring that the user enter the password, PIN or ID service number through an adjacent keypad.

Under an alternative embodiment, the check in function is accomplished via a social networking site (e.g., Face Book, Four Square, etc.). In this case, the portable device returns the social networking profile ID to the navigation program along with the initial location. Upon activation of the check in softkey, the portable device posts the arrival on the social networking site. The check in program detects the posting and proceeds as described above.

In general, the system can be used in the following ways. First, an authorized person can open the tool and fill in the details of the visitor identifying both the visitor and the host person. Next, the tool generates a hyperlink and sends it to a portable wireless device of the visitor. The visitor opens a web link in any location enabled smart device. The web link provides a map showing the direction to the visited location from the current location of the visitor to the visited location. The visitor can navigate to the visited location using the map. Once the visitor reaches the location, he/she can check in to notify the host. The host gets notified about the arrival of the visitor through e-mail.

The system provides a number of advantages. First, the system provides a dynamic location sensitive map which navigates the visitor from his/her current location to the visited location. The system provides the actual time required to reach the visited location by fetching real time traffic data. The system provides a user friendly way to provide notification of the visitor's late (or early) arrival to the person hosting the visit. The system eliminates the need for a visitor to identifying him/herself in the lobby to the front office receptionist and of the need for the receptionist to announce the visitor's arrival by making use of a digital check in that is automatically send from the visitor's smartphone or tablet. The host knows his visitor's current location and his expected time of arrival for a meeting.

In general, the system operates by a smartphone or tablet of a visiting user accessing a web site and security system of a visited person, the security system having a secured area with the visited person located at a predetermined location within the secured area, the web site downloading an initial geographical location of the visiting user from the smartphone or tablet of the visiting user, a processor of the web site generating and sending a map to the smartphone or tablet based upon the downloaded initial geographic location of the visiting user and the predetermined location of the visited person, the smartphone or table displaying the generated map on a display of the smartphone or tablet guiding the visiting user from the initial location of the visiting user to the predetermined location of the visited person and the processor of the website dynamically updating the map displayed on the smartphone or tablet.

Alternatively, the system includes a smartphone or tablet of a visiting user that accesses a web site and security system of a visited person, the security system having a secured area with the visited person located at a predetermined location within the secured area, a processor of the web site downloads an initial geographical location of the visiting user from the smartphone or tablet of the visiting user, a processor of the web site generates and sends a map to the smartphone or tablet based upon the downloaded initial geographic location of the visiting user and the predetermined location of the visited person, the smartphone or table displays the generated map on a display of the smartphone or tablet guiding the visiting user from the initial location of the visiting user to the predetermined location of the visited person and the processor of the website dynamically updates the map displayed on the smartphone or tablet.

In another embodiment, the system includes a security system, a smartphone or tablet of a visiting user accessing a web site of a visited person, the website uploading a navigation universal resource locator (URL) to the smartphone or tablet, the smartphone or tablet generating and displaying a map on a display of the smartphone or tablet based upon the uploaded navigation URL, the displayed map guiding the visiting user from the initial location of the visiting user to a location of the visited person, the smartphone or tablet automatically notifying the visited person upon arrival of the visiting person at the location of the visited person and the security system automatically granting access into the secured area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
  accessing, by a smartphone or a tablet of a visiting user, a web site and a security system of a visited person, wherein the security system has a secured area, and wherein the visited person is located at a predetermined location within the secured area;
  downloading, by a processor of the web site, an initial geographical location of the visiting user from the smartphone or the tablet of the visiting user;
  generating and sending a map, by the processor of the web site, to the smartphone or the tablet based upon the downloaded initial geographical location of the visiting user and the predetermined location of the visited person;
  displaying, by the smartphone or the tablet, the generated map on a display of the smartphone or the tablet guiding the visiting user from the initial geographical location of the visiting user to the predetermined location of the visited person;
  dynamically updating, by the processor of the web site, the displayed map displayed on the smartphone or the tablet;
  generating, by the processor of the website, an identification token for use by the visiting user upon arrival that is used to allow the visiting user access into the secured area without involvement of a receptionist or any other third party;
  detecting, by the smartphone or the tablet, that the visiting user has arrived at the secured area;
  posting, by the smartphone or the tablet, on a social media website an indication that the visiting user has arrived at the secured area in response to detecting that the visiting user has arrived at the secured area; and
  detecting, by the processor of the web site, the indication posted on the social media web site;
  determining, by the processor of the web site, that the visiting user has arrived at the secured area by reading a subsequent geographic location of the visiting user;
  automatically notifying, by the processor of the web site, the visited person that the visiting user has arrived in response to the visiting user activating a notify button on the displayed man.

2. The method as in claim 1 further comprising automatically notifying the visited person that the visiting user has arrived via e-mail.

3. The method as in claim 1 wherein further comprising automatically notifying the visited person that the visiting user has arrived via Facebook® message.

4. The method as in claim 1 further comprising the processor of the website automatically granting entry access through the security system at the secured area.

5. The method as in claim 4 further comprising the processor of the web site sending an access token to the smartphone or the tablet.

6. The method as in claim 5 wherein the access token comprises one of a password, a personal identification number (PIN), and an identification (ID) service number.

7. An apparatus comprising:
  a smartphone or a tablet of a visiting user that accesses a web site and a security system of a visited person, wherein the security system has a secured area, and wherein wife the visited person is located at a predetermined location within the secured area; and
  a processor of the web site that downloads an initial geographical location of the visiting user from the smartphone or the tablet of the visiting user and generates and sends a map to the smartphone or the tablet based upon the downloaded initial geographical location of the visiting user and the predetermined location of the visited person, wherein the smartphone or the tablet displays the generated map on a display of the smartphone or the tablet guiding the visiting user from the initial geographical location of the visiting user to the predetermined location of the visited person, wherein the processor of the web site dynamically updates the displayed map displayed on the smartphone or the tablet; and wherein the processor of the web site generates an identification token for use by the visiting user upon arrival that is used to allow the visiting user access into the secured area without involvement of a receptionist or any other third party, wherein the smartphone or the tablet detects that the visiting user has arrived at the secured area, wherein the smartphone or the tablet posts on a social media website an indication that the visiting user has arrived at the secured area in response to detecting that the visiting user has arrived at the secured area, and wherein the processor of the web site detects the indication posted on the social media website, and the processor of the web site determines that the visiting user has arrived at the secured area by reading a subsequent geographic location of the visiting user;

the processor of the web site automatically notifies the visited person that the visiting user has arrived in response to the visiting user activating a notify button on the displayed map.

8. The apparatus as in claim 7 further comprising the processor of the web site sending an invitation to the visiting user, wherein the invitation includes a navigation URL of the web site.

9. The apparatus as in claim 8 further comprising a web browser of the smartphone or the tablet that accesses the web site based upon the navigation URL.

10. The apparatus as in claim 7 wherein the smartphone or the tablet sends periodic updates of a current geographic location of the smart phone or the tablet.

11. The apparatus as in claim 7 wherein the processor of the web site updates the visited person with a current location of the visiting user and a time of arrival.

12. The apparatus as in claim 7 wherein the processor of the web site automatically generates a notification that is sent to the visited person indicating arrival by the visiting user.

13. The apparatus as in claim 7 wherein the smartphone or the tablet automatically generates a notification that is sent to the processor of the web site upon arrival at the secured area.

14. The apparatus as in claim 12 wherein the notification comprises one of e-mail, a Facebook® message and a Four Square® message.

15. The apparatus as in claim 7 wherein the processor of the web site automatically grants entry access through an entry of the security system at the secured area.

16. The apparatus as in claim 15 wherein the processor of the website sends an access token to the smartphone or the tablet.

17. The apparatus as in claim 16 wherein the access token comprises one of a password, a personal identification number (PIN), and an identification (ID) service number.

18. An apparatus comprising:
a security system; and
a smartphone or a tablet of a visiting user that accesses a web site of a visited person,
wherein the web site uploads a navigation universal resource locator (URL) to the smartphone or the tablet,
wherein the smartphone or the tablet generates and displays a map on a display of the smartphone or the tablet based upon the uploaded navigation URL,
wherein the displayed map guides the visiting user from an initial location of the visiting user to a location of the visited person,
wherein the smartphone or the tablet automatically notifies the visited person upon arrival of the visiting user at the location of the visited person, and
wherein the security system generates an identification token that is used to automatically grant access into the secured area by the visiting user without involvement of a receptionist or any other third party,
wherein the smartphone of the tablet detects that the visiting user has arrived at the location of the visited person,
wherein the smartphone or the tablet posts on a social media website an indication that the visiting user has arrived at the location of the visited person in response to detecting that the visiting user has arrived at the location of the visited person, and
wherein the web site detects the indication posted on the social media website, and
the processor of the web site determines that the visiting user has arrived at the secured area by reading a subsequent geographic location of the visiting user;
the processor of the web site automatically notifies the visited person that the visiting user has arrived in response to the visiting user activating a notify button on the displayed man.

* * * * *